May 30, 1950  D. MORRISON  2,509,693
TIMING AND SIGNALING SYSTEM FOR SOUP HEATING CUPS
Filed Sept. 24, 1948
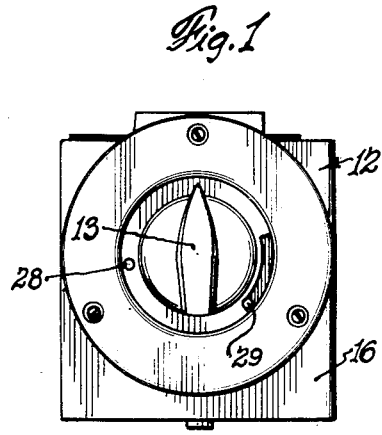
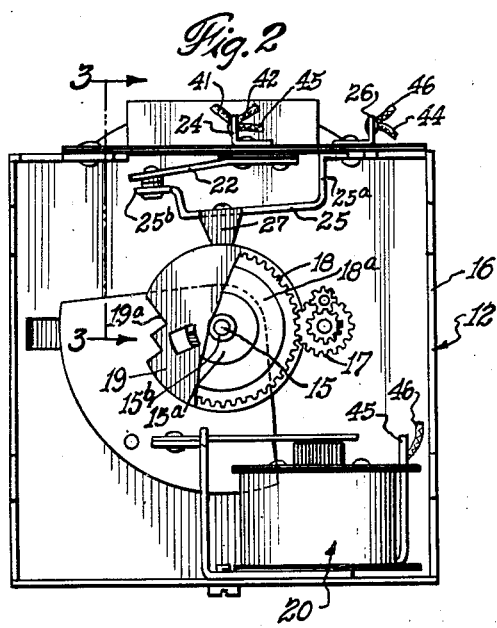
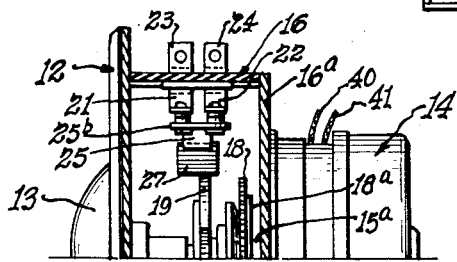
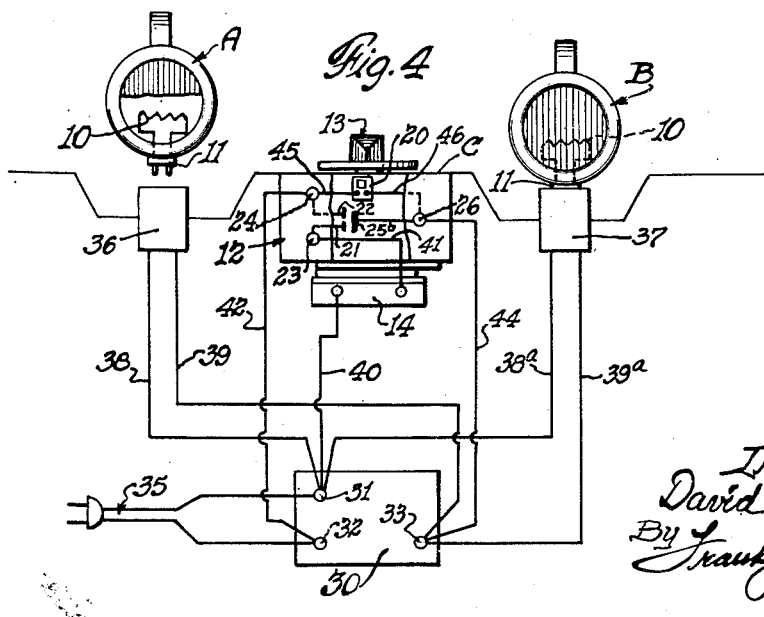
INVENTOR
David Morrison
By Frank Schraeder Jr.
Attorney Patented May 30, 1950

2,509,693

UNITED STATES PATENT OFFICE 2,509,693

TIMING AND SIGNALING SYSTEM FOR SOUP HEATING CUPS

David Morrison, Manitowoc, Wis., assignor to Paragon Electric Company, Two Rivers, Mich., a corporation of Wisconsin Application September 24, 1948, Serial No. 50,901

6 Claims. (Cl. 219—20)

1

It is a common practice, in certain types of places where food is eaten on the spot to heat each helping of soup individually and serve it immediately; the soup to be heated being placed in a cup that is plugged into an outlet connected to the local electrical distribution system.

Various difficulties have been encountered in the aforesaid procedure, and it is the primary object of my invention to overcome them.

When a cup is plugged into an outlet, in conventional practice, it immediately becomes energized; and, if an operator becomes careless or forgetful, so that an empty cup is plugged in and left for a short time, the heating element may burn out. This is because the heating element must be heated to a very high temperature quickly in order that the soup may be heated as rapidly as possible.

Specifically stated, one of the objects of my invention is to cause to be given, whenever a cup is plugged in, an audible signal or alarm of such a character that the operator cannot fail to become aware of it; so that he can detach an empty cup, should one be plugged in inadvertently, before harm is done.

A further specific object of the invention is to give the same warning, at the end of the heating step, as at the beginning; the signal being silenced only by the act of detaching the cup from the outlet.

In prior systems a bell is caused to ring at the end of a heating period; but, since the bell does not ring until a timer has been set and a predetermined period has elapsed, the operator may forget to set the timer after plugging in the cup. This, in prior system has resulted in overheating and damage to both soup and cup.

A further specific object of my invention is to cause the signal to become silent as soon as the operator sets the timer and remain so until the pointer on the timer again is returned to the off position; so that, if the initial audible signal does not stop, the operator knows that he has not set the timer.

A still further specific object of the present invention is to prevent damage to the soup cup or to the soup by preventing the heating of the cup until the timer has been set; so that if the operator plugs in a cup and fails to set the timer, neither cup nor soup becomes heated.

The various features of novelty whereby the present invention is characterized will hereinafter be pointed out with particularity in the claims; but, for a full understanding of the invention and of its objects and advantages, reference may be had to the following detailed description taken in connection with the accompanying drawing wherein:

Figure 1 is a front view of a timer used in carrying out my invention; Fig. 2 is a view, on a larger scale, looking at the rear of the timer, after removing the rear wall of the casing and the motor and most of the gear train mounted thereon; Fig. 3 is a section through the upper part of the timer on line 3—3 of Fig. 2; and Fig. 4 is a diagram illustrating my system adapted to heat either of two soup cups, or both at the same time, using only one timer.

In the drawing I have shown by top plan view two conventional soup heating cups, A and B, each containing a heating element 10, shown diagrammatically, together with a plug 11 adapted to attach the cup to a conventional outlet.

The control of the current to heat the cups is by a timer 12, of a well known type that has a pointer 13 for setting it manually, and a motor 14 for returning the pointer to the starting position; the motor always turning in the same direction when energized. The pointer is fixed to the outer end of a cam shaft 15 that protrudes through the front wall of the casing 16; whereas the motor drives the shaft through a gear train 17, the last element of which meshes with a large gear wheel 18 on the cam shaft. Gear wheel 18 is loose on and frictionally secured to the shaft so that the shaft may be turned relatively thereto by means of the pointer to set the timer; conveniently by a friction disc 18$^a$ pressed against the wheel by a flange 15$^a$ on a sleeve 15$^b$ fixed to the shaft.

The motor and its gear train are mounted on a detachable rear wall 16$^a$ of the timer casing.

Fixed to the shaft 15 is a cam 19 in the form of a disc provided with a peripheral notch 19$^a$.

Within the casing is a suitable audible signalling device, preferably a buzzer 20, mounted in the lower part of the casing, as shown.

In the top of the casing is a switch device adapted to open and close two different branches of the wiring system. This device consists of two parallel spring fingers 21 and 22, arranged side by side in spaced relation to each other and fixed at corresponding ends to the top wall of the casing and to terminals 23 and 24, respectively. Underlying these two fingers is a longer, spring arm 25 bent up at one end, as at 25$^a$, beyond the anchored ends of the fingers and fastened to the top wall of the casing and to a terminal 26. On the free end of arm 25 is a cross piece 25$^b$ wide enough to span the distance between the free ends of both fingers and to make good contact with the same when the arm is pressed up. When free to do so, the free end of arm 25 swings down and out of engagement with the cooperating fingers. Fixed to the arm 25, remote from its anchored end, is a little block 27 of insulating material adapted to rest on the edge of cam disc 19. The parts are so proportioned that while block 27 rests on the unmutilated portion of the disc, part 25b is held firmly pressed against fingers 21 and 22, as shown in the drawings. However, when the cam is turned in the clockwise direction, in Fig. 2, until block 27 registers with notch 19a in the disc, the spring arm snaps down away from the cooperating switch members, breaking the circuits which the switch device controls.

As can be seen from Fig. 1, the pointer may swing through an arc the ends of which are determined by two pins, 28 and 29, the former being the zero or off point and the latter the end of the swing in setting the timer. In the drawing the pointer is shown roughly half way between the two pins and may be regarded as being at an intermediate point in a movement in either direction. Ordinarily the pin 29 is adjusted so that the full sweep of the pointer affords the desired soup-heating time; so that the operator need simply move the pointer away from the off position, as far as it will go, to begin a heating operation; after which the heating time is ended automatically.

The function performed by the timer can best be understood by viewing it as part of the system as a whole.

A separate timer may of course be used with each soup heater. However, timers can easily be made to control two such heaters, and that is the system illustrated in Fig. 4.

Referring to Fig. 4, 30 represents a terminal block provided with terminals 31, 32 and 33. A cord 35, adapted to be plugged into a convenient outlet, is connected to terminals 31 and 32 for supplying the necessary electric current.

The timer is shown as being disposed behind a thin vertical wall C that may be said to form the front of the soup kitchen in a typical installation, with the pointer located in front of such wall. Fixed in and extending through wall C, one on each side of the timer, are two outlets or receptacles, 36 and 37, into which the soup cups are adapted to be plugged. Outlet 36 is connected to terminals 31 and 33 by wires 38 and 39, respectively; while outlet 37 is connected to these same terminals by wires 38a and 39a, respectively. One terminal of the motor is connected to terminal 31 by wire 40, while the other motor terminal is connected to switch terminal 23 by wire 41. Switch terminal 24 is connected to terminal 32 on the terminal block by wire 42. Switch terminal 26 is connected to terminal 33 by wire 44. Buzzer 20 is connected to switch terminals 24 and 26 by wires 45 and 46, respectively.

Normally, with the pointer on the timer in the off or idle position, against stop in 28, the notch in cam disc 19 registers with block 27 on switch arm 25, so that the arm is down in the switch-open position. At such times, if neither soup cup has been plugged in, the system is deenergized, even though cord 35 is connected to a source of current. Upon plugging in one of the soup cups, cup B for example, current flows from terminal 31, through the heating element of that cup, to terminal 33, and from there to switch terminal 26, through the buzzer to terminal 24, and to terminal 32. The resistance of the buzzer is so great compared with that of the heating element in the soup cup, with which it is now in series, that, although the buzzer sounds loudly, any temperature rise in the heating element of the cup is negligible; and thus no damage to that element can result, even though the cup be empty. The noise made by the buzzer will induce the attendant to set the timer as that will stop the noise. In other words, when the pointer is swung from its idle position, against stop pin 28, toward or to pin 29, the double switch is closed and by-passes or short circuits the buzzer. Now the current that flows through the heating element in the cup is at full strength and that element attains the desired cooking temperature.

No current flows through the motor until the switch in the timer is closed, whereupon the motor begins to run and immediately starts the pointer back to the off position. When the pointer reaches the off position, a predetermined interval of time after the timer is set, the switch opens and the motor stops; but, at the same time, the buzzer is again connected in series with the soup heating element and begins buzzing, while the current flow through said element is reduced to a value that is negligible as far as heating is concerned. Thus the attendant is made aware of the fact that the soup is hot and that he should take it away if the sounding of the buzzer is to stop.

Since the two cups, when both are plugged in, are connected in parallel to the current supplying lines, neither influences the other and the signalling is the same whether one or both cups be used at the same time. However, in systems adapted for the use of two cups, instead of only one, care must still be taken that no empty cup is plugged in at the same time as a full cup or while the latter is being heated.

It will be noted that in a two-cup system, both cups may be plugged in at the same time or one may be plugged in after the heating of the other has been partially done if need be. If the pointer is at the half way point on its return journey at the time a second cup is plugged in, the attendant need only reset the timer to that point after it reaches its off position at the end of the heating period for the first cup; thereby saving considerable time in heating the second cup.

While I have illustrated and described with particularly only a single preferred form of my invention, I do not desire to be limited to the exact details thus illustrated and described, but intend to cover all forms and arrangements that come within the definitions of my invention constituting the appended claims.

I claim:

1. A signalling and controlling system for an electrically heated device comprising an electrical heating element and provided with a plug for insertion in an outlet to connect said element to an energizing circuit, an electrical signal device of much higher resistance than said heating element, an electric circuit containing said signal device and an outlet for the reception of said plug in series with each other, and a timer for said circuit; said timer containing a switch to short circuit said signal device, a cam to cause the switch to open and close, a manually operable member to move the cam in the direction to close said switch, a motor to move the cam in the direction to open said switch after a predetermined lapse of time following the closing of the switch, and switch means associated with said switch to deenergize and energize the motor simultaneously with the opening and closing, respectively, of said switch.

2. A signalling and controlling system for an electrically heated device comprising an electrical heating element and a plug for insertion in an outlet in an electrical system, an electrical signal device of much higher resistance than said heating element, a circuit containing said signal device and an outlet to receive said plug in series with each other, and a timer for said circuit; said timer containing a switch to bypass said signal device, a shaft having thereon a cam to cause the switch to close in one angular position of the shaft and to be closed in other angular positions, a pointer fixed to said shaft to turn the same, a motor, a gear train from the motor including a gear wheel loose on and frictionally held to the shaft to turn the shaft in the direction to cause the switch to open after a predetermined lapse of time following the closing of the switch, and means associated with said switch to deenergize and energize the motor with the opening and closing, respectively, of the switch.

3. The combination with an electrically heated device having a heating element and a terminal plug device, of a circuit containing an outlet to receive said plug device, an audible, electrically operated signal device of much greater resistance than said heating element connected in said circuit so as to be in series with said heating element when said electrically heated device is plugged in, a switch connected in said circuit to create a bypass around the signal device when closed; and a timer including a manually operable member to cause the switch to close, an electric motor to open the switch after a predetermined lapse of time following the closing of the switch, and means associated with said switch to close and open a circuit through the motor as the switch is closed and opened, respectively.

4. The combination with an electrically heated device having a heating element and a terminal plug device, of a circuit containing an outlet to receive said plug device, an audible, electrically operated signal device of much greater resistance than said heating element connected in said circuit so as to be in series with said heating element when said electrically heated device is plugged in, a switch connected in said circuit to create a bypass around the signal device when closed; and a timer including a switch actuator, a manually operable member to move the actuator in the direction to cause the switch to close, and electric motor to move the actuator in the direction to open the switch after a predetermined lapse of time following the closing of the switch, and means associated with said switch to close and open a circuit through the motor as the switch is closed and opened, respectively.

5. The combination with an electrically heated device having a heating element and a terminal plug device, of a circuit containing an outlet to receive said plug device, an audible, electrically operated signal device of much greater resistance than said heating element connected in said circuit so as to be in series with said heating element when said electrically heated device is plugged in, a switch that tends constantly to open connected in said circuit to create a bypass around the signal device when closed; and a timer including a cam to close the switch, a manually operable member to move the cam in the direction to cause the switch to close, an electric motor, driving connections between the motor and the cam to move the cam in the opposite direction to open the switch after a predetermined lapse of time following the closing of the switch, and means associated with said switch to close and open a circuit through the motor as the switch is closed and opened, respectively.

6. A signalling and controlling system for an electrically heated apparatus, comprising an energizing circuit for said apparatus, an electrical audible signal means connected in said circuit, an outlet in the circuit for plugging in said apparatus to complete the circuit, a switch to create a bypass around the signal means, a timer including a manually operable member for closing said switch and an electric motor for opening it, and means associated with said switch to cause the motor to be energized upon the closing of the switch and to be deenergized upon the opening of the switch; whereby the audible signal sounds when said apparatus is plugged in, remains silent as soon as the switch is closed and the motor energized, and again sounds when the switch is again opened.

DAVID MORRISON.

REFERENCES CITED

The following references are of record in the file of this patent:

UNITED STATES PATENTS

| Number | Name | Date |
| --- | --- | --- |
| 1,961,871 | Caskey | June 5, 1934 |
| 2,237,147 | Ireland | Apr. 1, 1941 |
| 2,293,764 | Roeder | Aug. 25, 1942 |
| 2,370,621 | Freitag et al. | Mar. 6, 1945 |

Certificate of Correction

Patent No. 2,509,693 May 30, 1950

DAVID MORRISON

It is hereby certified that error appears in the above numbered patent requiring correction as follows:

In the grant, lines 2 and 3, address of assignee, for "Two Rivers, Michigan" read *Two Rivers, Wisconsin*; and in the heading to the printed specification, line 5, for "Two Rivers, Mich." read *Two Rivers, Wis.*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*